United States Patent [19]
Trivedi et al.

[11] Patent Number: 6,061,989
[45] Date of Patent: *May 16, 2000

[54] MODULAR STRUCTURAL COMPONENTS

[75] Inventors: Mukesh R. Trivedi; Suhail Ahmad, both of Allentown, Pa.

[73] Assignee: Mack Trucks, Inc., Allentown, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 09/089,494

[22] Filed: Jun. 2, 1998

[51] Int. Cl.[7] ...................................................... E04B 1/19
[52] U.S. Cl. .............................. 52/633; 29/428; 29/897.2; 248/200; 248/300
[58] Field of Search ............................... 52/633; 248/200, 248/300, 674, 675; 29/428, 897.2

[56] References Cited

U.S. PATENT DOCUMENTS

| 841,221 | 1/1997 | Becker et al. . | |
|---|---|---|---|
| 847,135 | 3/1907 | Voss et al. . | |
| 1,502,227 | 7/1924 | Arnstein | 29/897.2 X |
| 1,720,796 | 7/1929 | Marcum et al. . | |
| 1,826,503 | 10/1931 | Buckwalter | 29/428 |
| 1,928,942 | 10/1933 | Maddock et al. . | |
| 2,097,113 | 10/1937 | Bradley | 29/897.2 X |
| 2,154,154 | 4/1939 | Eklund et al. . | |
| 2,173,515 | 9/1939 | Eklund . | |
| 2,494,115 | 1/1950 | Bock et al. . | |
| 3,137,923 | 6/1964 | Schilberg | 29/897.2 |
| 3,815,210 | 6/1974 | Eccleston et al. | 29/428 X |
| 3,905,644 | 9/1975 | Feterl | 29/428 X |
| 4,386,792 | 6/1983 | Moore et al. . | |
| 4,449,603 | 5/1984 | Langwieder et al. . | |
| 5,005,864 | 4/1991 | Chachere . | |
| 5,561,902 | 10/1996 | Jacobs et al. | 29/897.2 |

*Primary Examiner*—Carl D. Friedman
*Assistant Examiner*—Phi Dieu Tran A
*Attorney, Agent, or Firm*—Rothwell, Figg, Ernst & Kurz, p.c.

[57] ABSTRACT

A modular approach to constructing a structural member entails utilizing generally identical primary structural elements which are connected together by various different connector elements to create structural members with various different structural properties. Such a structural member may be, for example, a cross-member for use in constructing an automotive frame.

4 Claims, 7 Drawing Sheets

MODULAR STRUCTURAL COMPONENTS

BACKGROUND OF THE INVENTION

The invention relations in general to structural engineering and, in particular, to a modular approach to designing structural components. In designing a structural unit, e.g., the frame of a vehicle, each constituent member or component of the structural unit typically is designed in its entirety specifically for the structural loads (tensile, compressive, and/or shear forces, torques, and/or bending moments) to which it will be subjected. Such an approach to designing and building a structural assembly such as an automotive frame increases the time and cost both to design and build the assembly.

SUMMARY OF THE INVENTION

The invention provides a novel approach to designing and building structural assemblies which reduces the time and cost to design and build the assembly. Although the approach according to the invention theoretically could be applied to most any structural assembly, the invention will be described herein in the context of designing and constructing structural cross-members which are used in automotive frames—i.e., structural members which extend laterally between the longitudinally extending, primary load-bearing rails of the frame.

In accordance with the invention, a structural member has a pair of primary structural elements which, in large part, define the structural element. The primary structural elements are joined together by one or more secondary connector elements to form a structural load-bearing member. Using primary structural elements that are essentially identical to the primary structural elements of a first structural load-bearing member, a second structural load-bearing member can be constructed by modifying the positioning and/or configuration of the secondary connector elements. In this manner, the structural properties of the second load-bearing member—i.e., its ability to carry forces, moments, and torques—can be tailored to match the structural requirements at its location within the entire structural assembly.

BRIEF DESCRIPTION OF THE DRAWINGS

The invention will now be described in greater detail in connection with the drawings in which.

DETAILED DESCRIPTION OF THE INVENTION

Figure 1:
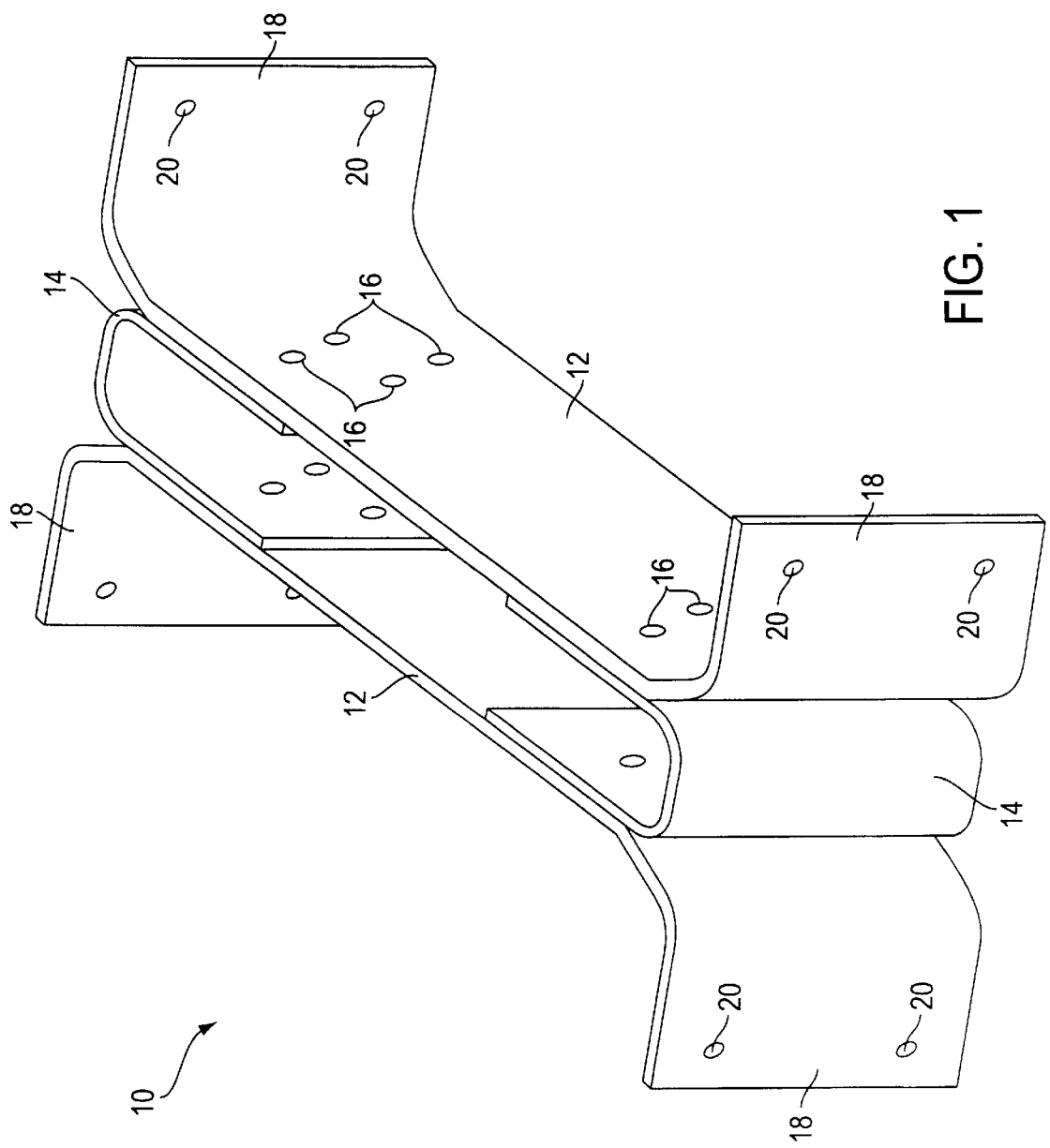
FIGS. 1–7 are perspective views showing various possible configurations of a cross-member employing the principles of the invention.

The basic configuration of a cross-member 10 constructed according to the invention is shown in FIG. 1. The cross-member 10 has a pair of elongated, plate-type primary structural load-bearing elements 12 which are connected together by generally U-shaped, secondary connector elements 14 to form a composite structural load-bearing member. The plate-like elements 12 and connector elements 14 are connected together, e.g., by rivets 16 or other appropriate fastening means. The plate-like elements 12 have flared flanges 18 at the ends thereof, with fastener holes 20 provided therein, by which the assembly is connected to the web portions of C-section-type rails. Alternatively, the plate-type structural elements 12 could be configured with flanges extending from the top and bottom portions thereof to facilitate connection to the flanges of C-section-type longitudinal rails.

It will be appreciated that the structural load-bearing element 10 shown in FIG. 1 will have a set of structural properties, i.e., an ability to carry particular tensile, compressive, or shear loads; bending moments; and/or torques. According to the invention, these structural properties are modified by modifying the configuration of the secondary connector elements 14 while maintaining the same general configuration of the elements 12.

Figure 2:
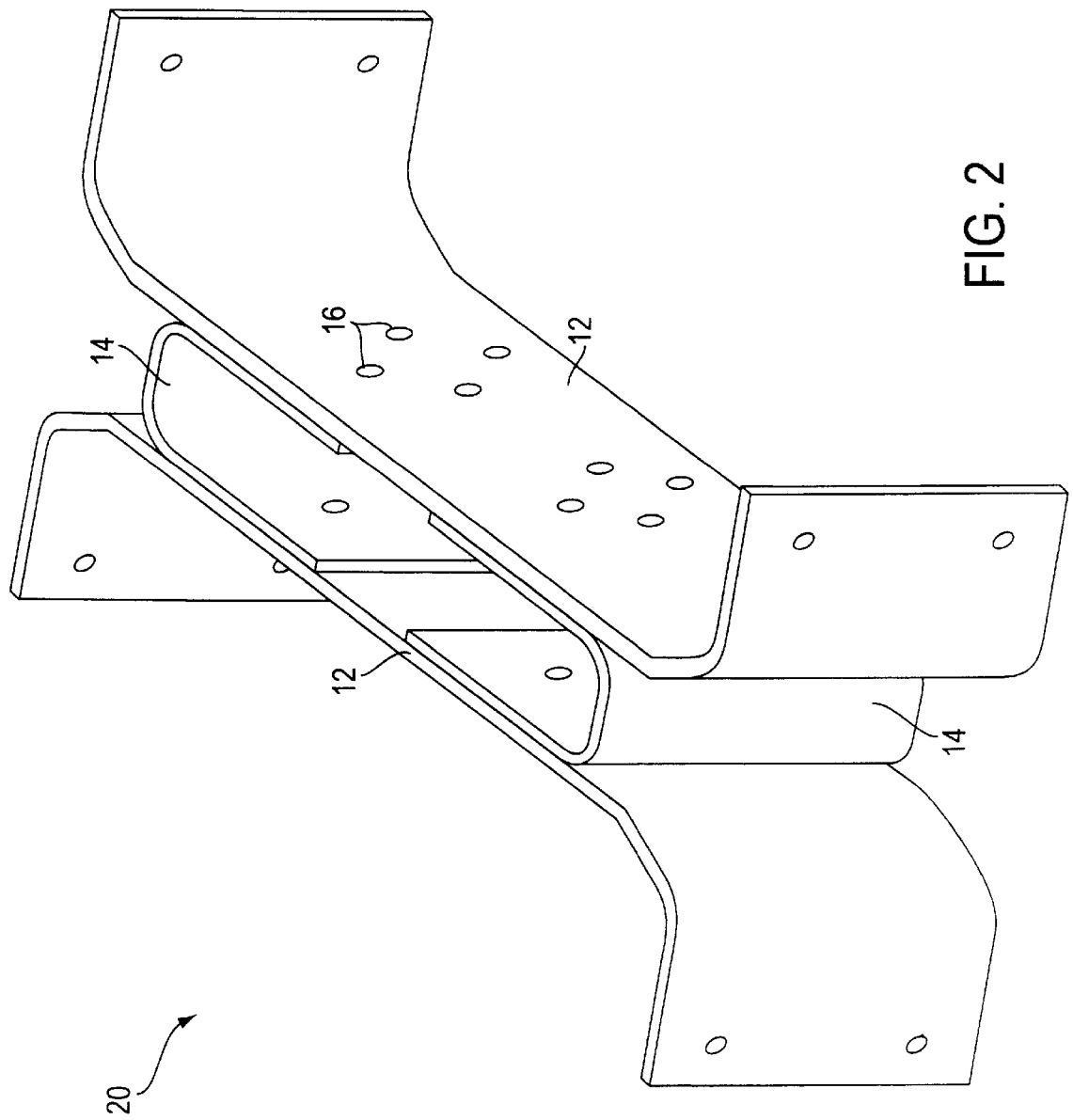

For example, as shown in FIG. 2, the connector elements 14 may be positioned closer to the longitudinally central portion of the plate-like elements 12, but otherwise are the same as in FIG. 1. Rivets 16 are re-positioned accordingly, but the elements 12 in the structural member 20 of FIG. 2 are otherwise identical to the elements 12 of the member 10 shown in FIG. 1.

Figure 3:
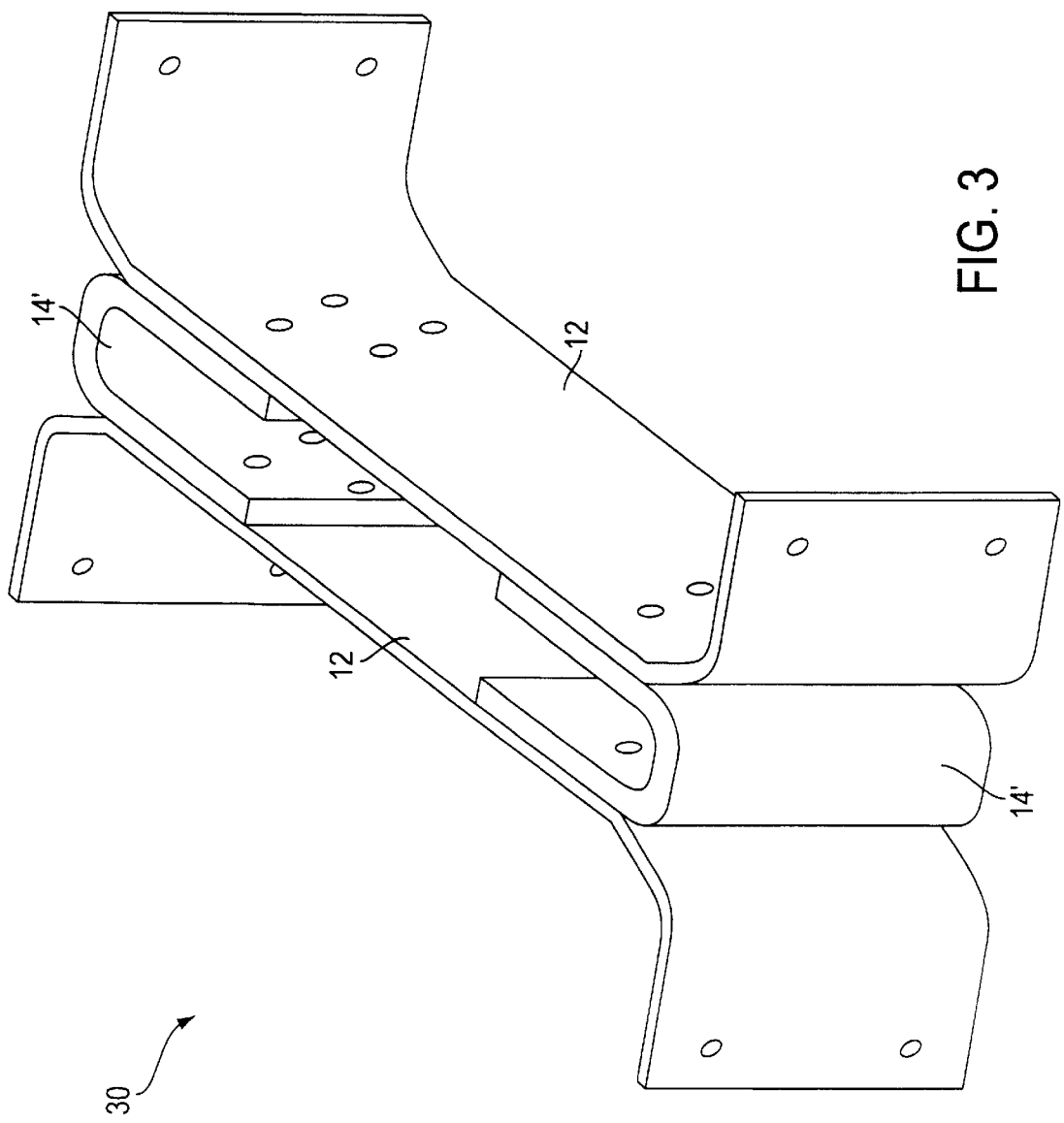

The structural member 30 shown in FIG. 3, in contrast, has connector elements 14' that are positioned relative to the primary elements 12 the same as in the case of the member 10 shown in FIG. 1, but which are, e.g., twice as thick.

Figure 4:
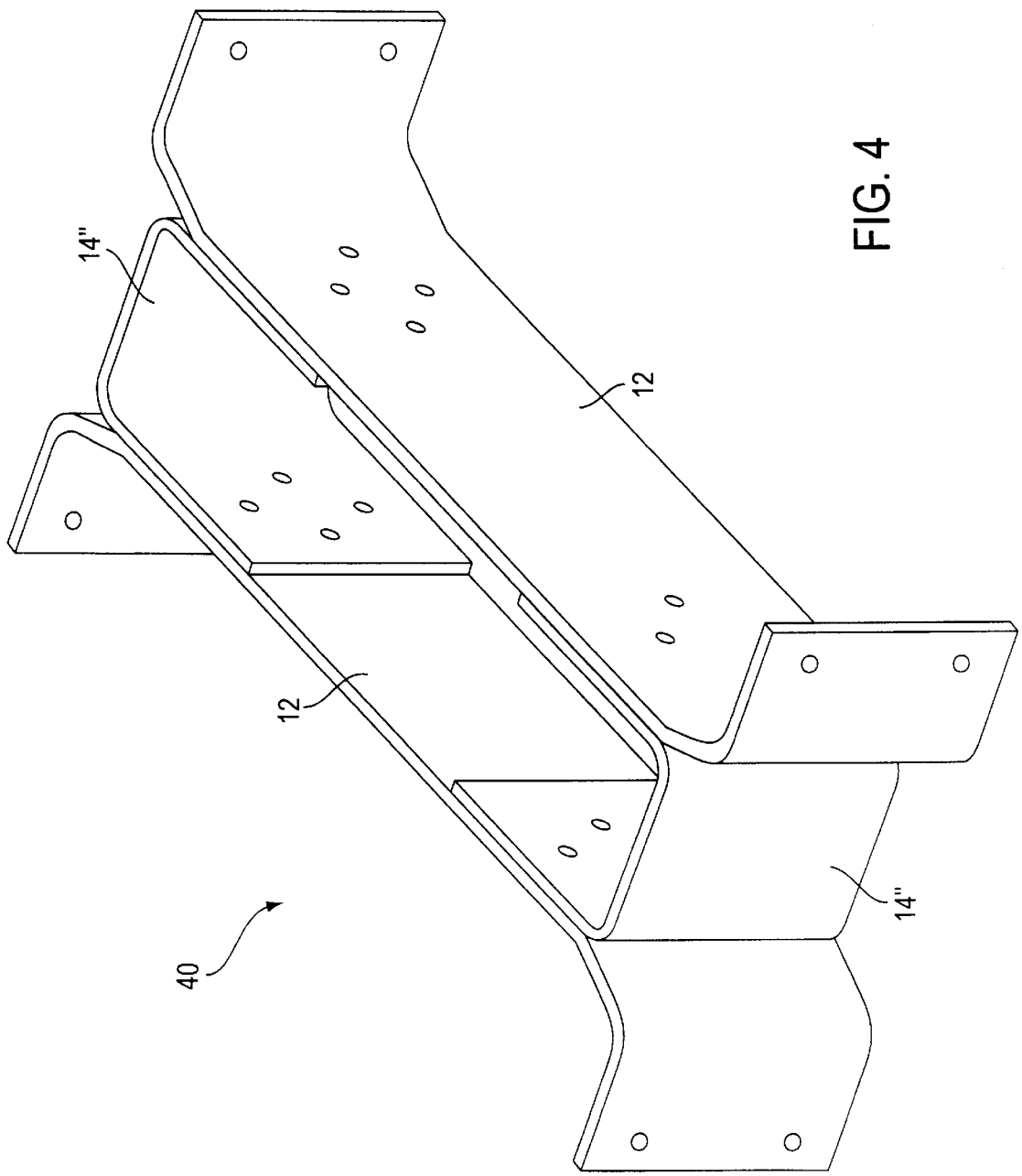

In FIG. 4, the structural member 40 once again has the same plate-type elements 12, but the connector elements 14" are considerably wider such that the elements 12 are spaced farther apart.

Figure 5:
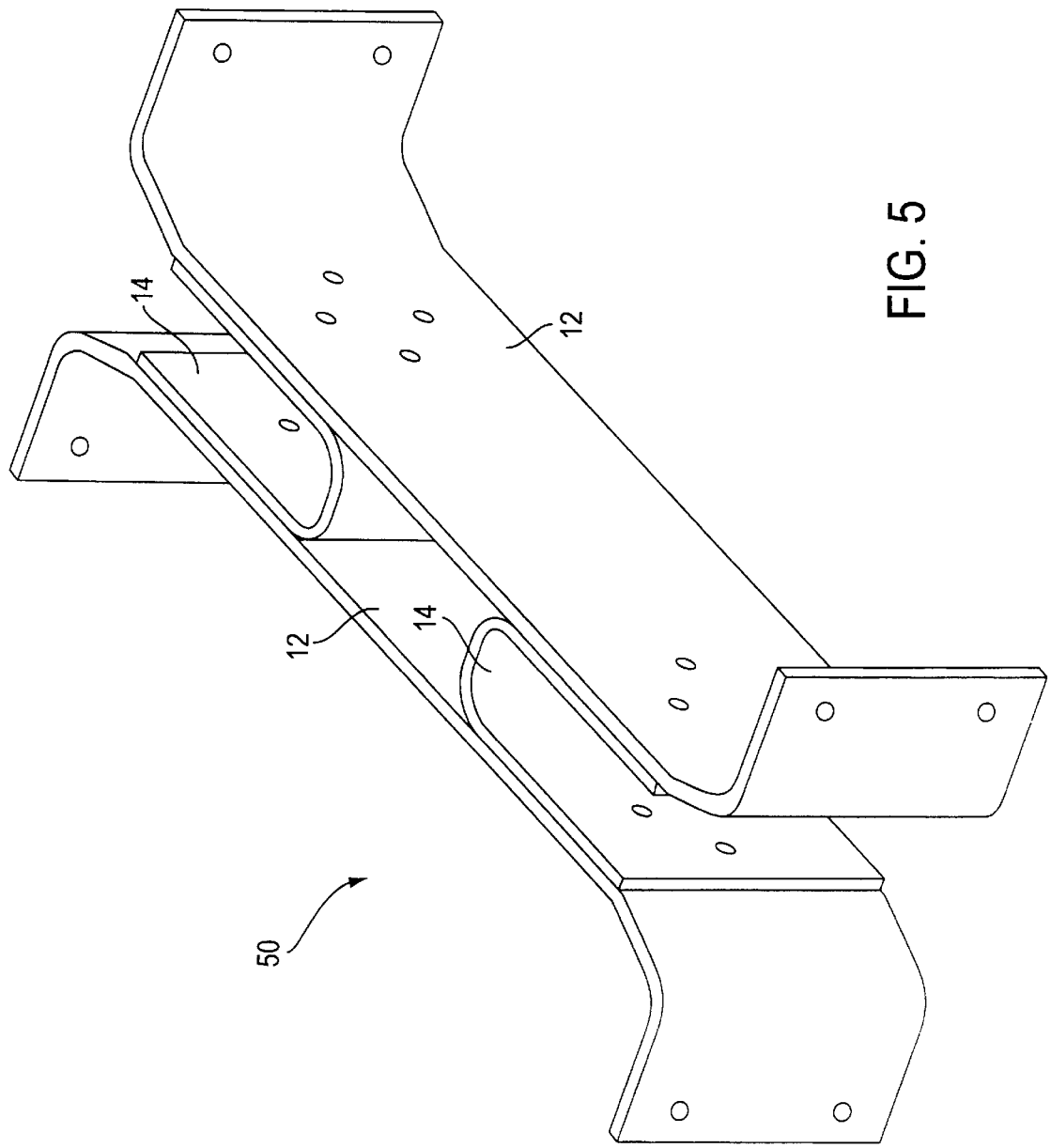

In FIG. 5, the structural member 50 has generally the same connector elements 14 as the member 10 in FIG. 1 does, but the connector elements 14 are "inverted," such that the bottom portion of the U is located "inboard" as opposed to "outboard."

Figure 6:
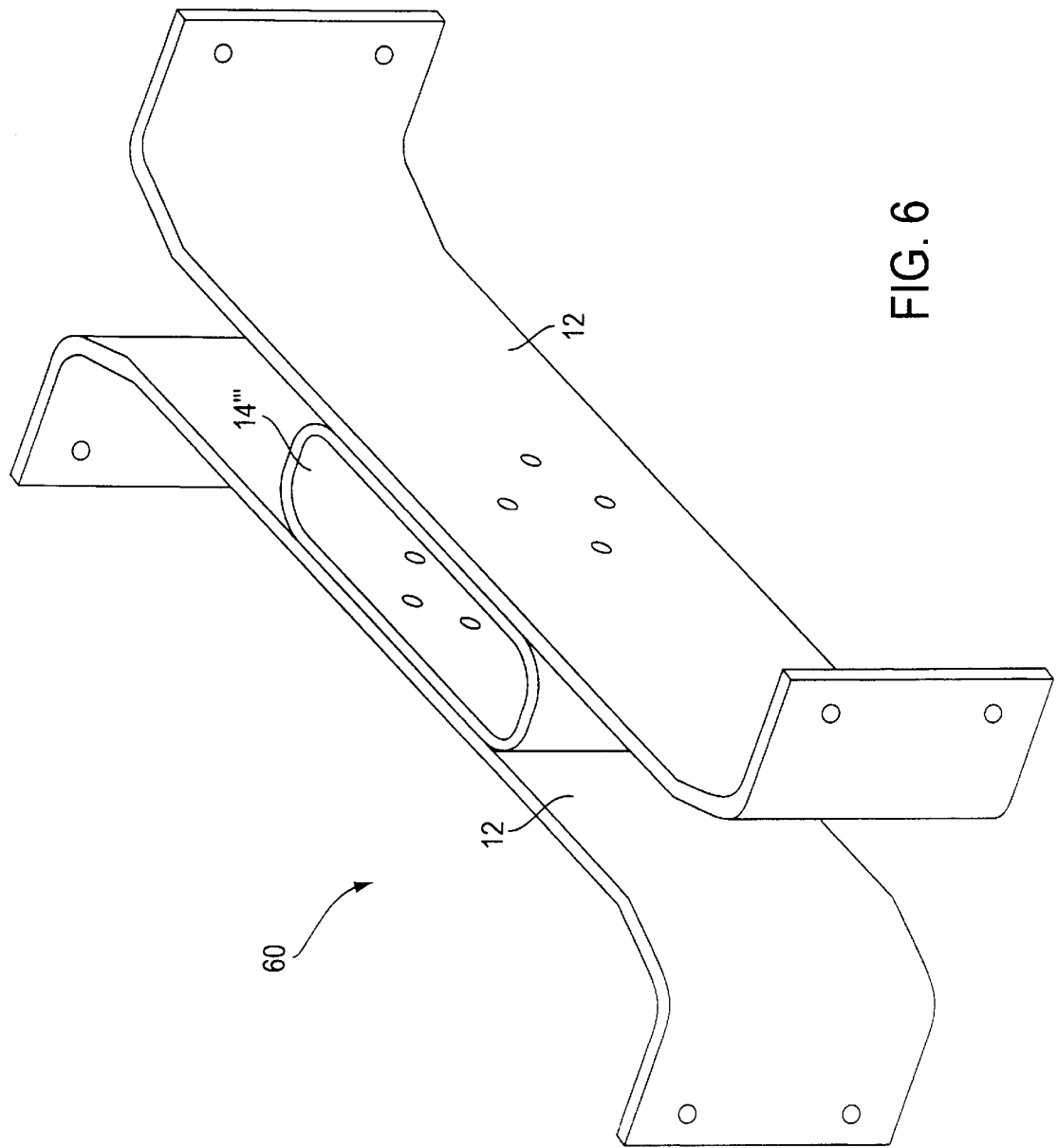

In FIG. 6, the two connector elements are replaced with a single connector element 14'''. The connector element 14''' may consist of a band-shaped segment of a hollow, extruded length of material.

Figure 7:
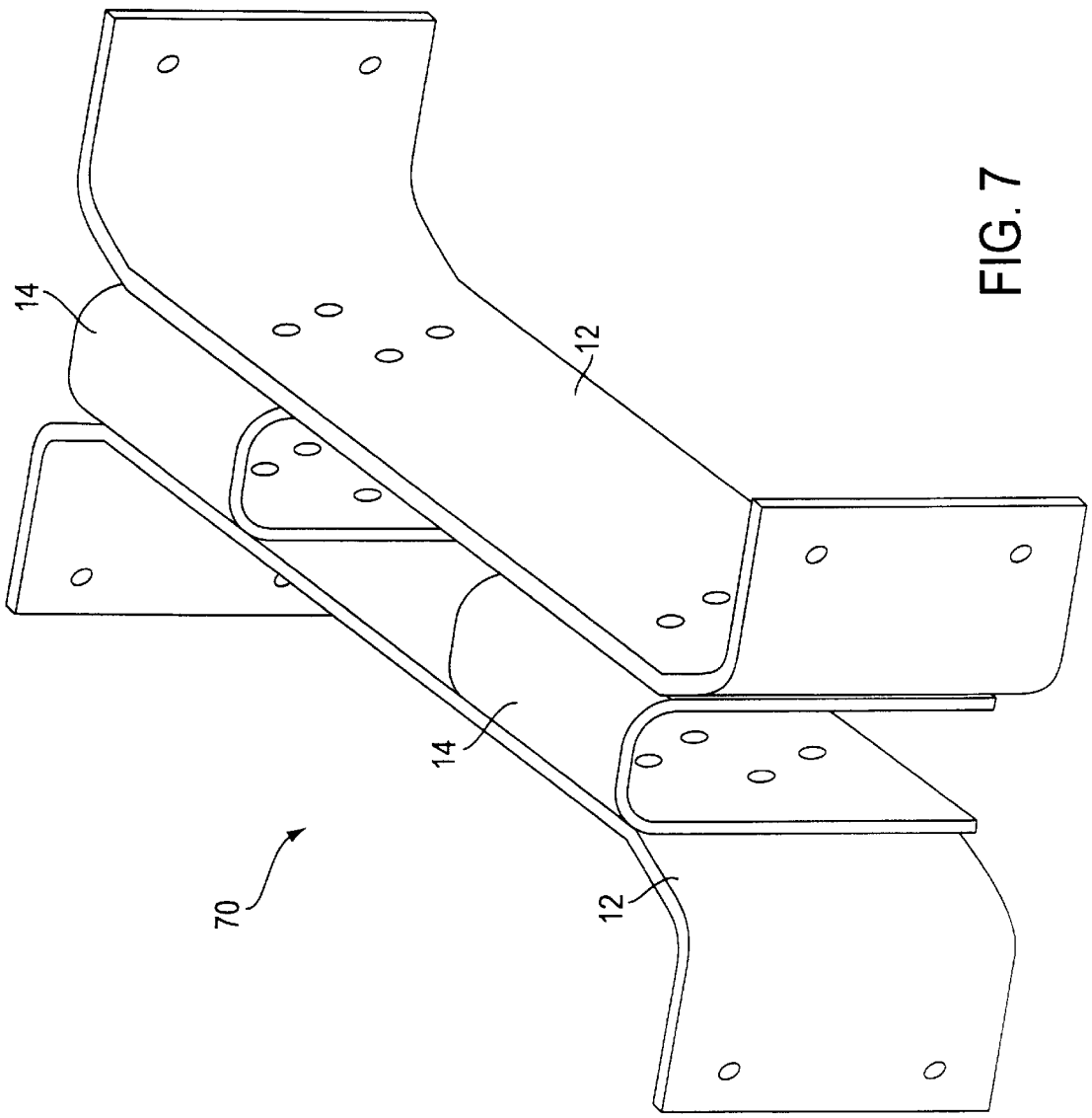

In yet another illustrated structural member 70 as shown in FIG. 7, the connector elements 14 are generally the same as those shown in FIG. 1, but they are positioned with their closed ends generally parallel to the length of the member 70.

Although each of the different structural members 20–70 shown in FIGS. 2–7 varies from the structural member 10 shown in FIG. 1 by a single change with respect to the connector elements used to connect the plate-like primary elements 12 (which are essentially identical, except for the location of rivets), it will be appreciated that various combinations of such changes can be employed. For example, the connector elements may be both inverted and thicker, or they may be inverted, thicker, and wider. The possibilities for creating diverse structural members with the same primary elements, all of which constitute a family set of structural members, are vast. The configurations described above and all other possible configuration utilizing generally identical primary structural elements are deemed to be within the scope of the following claims.

What is claimed:

1. A method of constructing an automotive structural frame assembly, said method comprising selecting a plurality of structural members, and assembling said plurality of structural members to form said automotive structural frame assembly, said plurality of structural members including at least a first tailored structural member of fixed, predetermined length and a second tailored structural member of fixed, predetermined length that is the same as the length of said first tailored structural member, said first tailored structural member being formed from a first set of flat plate, elongated primary structural elements having fixed, predetermined lengths and flanged lengthwise ends, said first set of primary structural elements being joined together by means of one or more first secondary connector elements having spaced-apart legs and generally U-shaped ends disposed between said first set of primary structural elements in fixed, predetermined location or locations; and said second tailored structural member being formed from a second set of flat plate, elongated primary structural elements having fixed, predetermined lengths and flanged lengthwise ends, said second set of primary structural elements being joined together by means of one or more second secondary connector elements having spaced-apart legs and generally U-shaped ends disposed between said second set of primary structural elements in fixed, predetermined position or positions, said second set of primary structural elements being identical to said first set of primary structural elements in size, shape, and configuration and said one or more second secondary connector elements differing from said one or more first secondary connector elements such that the structural properties of said second tailored structural member differ from the structural properties of said first tailored structural member, wherein said selecting a plurality of structural members comprises selecting the tailored structural members such that the structural properties of said first tailored structural member are matched to the specific structural loads of said automotive frame at the location of said first tailored structural member and the structural properties of said second tailored structural member are matched to the specific structural loads of said automotive frame at the location of said second tailored structural member.

2. The method of claim 1, wherein said selecting a plurality of structural members comprises fabricating said tailored structural members by a) selecting said first set of flat plate, elongated primary structural elements having fixed, predetermined lengths and flanged lengthwise ends and joining said first set of primary structural elements together by means of said one or more first secondary connector elements having spaced-apart legs and generally U-shaped ends to form said first structural load-bearing member of fixed, predetermined length, and b) selecting said second set of flat plate, elongated primary structural elements having fixed, predetermined lengths and flanged lengthwise ends and joining said second set of primary structural elements together by means of said one or more second secondary connector elements having spaced-apart legs and generally U-shaped ends to form said second structural load-bearing member.

3. A tailored, automotive structural frame assembly produced according to the method of claim 1.

4. A tailored, automotive structural frame assembly produced according to the method of claim 2.

* * * * *